US012227415B2

(12) United States Patent
Klepper et al.

(10) Patent No.: US 12,227,415 B2
(45) Date of Patent: Feb. 18, 2025

(54) SYSTEM AND METHOD FOR MAKING SYNGAS

(71) Applicants: James E. Klepper, Thornton, CO (US); Brenda Klepper, Thornton, CO (US)

(72) Inventors: James E. Klepper, Thornton, CO (US); Brenda Klepper, Thornton, CO (US)

(73) Assignee: JBK Extractions LLC, Thornton, CO (US)

( * ) Notice: Subject to any disclaimer, the term of this patent is extended or adjusted under 35 U.S.C. 154(b) by 744 days.

(21) Appl. No.: 17/363,591

(22) Filed: Jun. 30, 2021

(65) Prior Publication Data

US 2022/0002152 A1    Jan. 6, 2022

Related U.S. Application Data

(60) Provisional application No. 63/113,210, filed on Nov. 13, 2020, provisional application No. 63/046,968, filed on Jul. 1, 2020.

(51) Int. Cl.
*C01B 3/36* (2006.01)
*C01B 3/12* (2006.01)
(Continued)

(52) U.S. Cl.
CPC ................. *C01B 3/36* (2013.01); *C01B 3/12* (2013.01); *C01B 3/24* (2013.01); *C10J 3/485* (2013.01); *C01B 2203/0272* (2013.01); *C01B 2203/0811* (2013.01); *C01B 2203/0833* (2013.01); *C01B 2203/0877* (2013.01); *C01B 2203/0883* (2013.01); *C01B 2203/1235* (2013.01); *C01B 2203/148* (2013.01); *C01B 2203/82* (2013.01); *C10J 2300/092* (2013.01); *C10J 2300/093* (2013.01); *C10J 2300/0946* (2013.01); *C10J 2300/0956* (2013.01); *C10J 2300/0976* (2013.01); *C10J 2300/1253* (2013.01); *C10J 2300/1606* (2013.01)

(58) Field of Classification Search
CPC ..... C01B 2203/0272; C01B 2203/0811; C01B 2203/0833; C01B 2203/0877; C01B 2203/0883; C01B 2203/1235; C01B 2203/148; C01B 3/36; C01B 3/12; C01B 3/24; C01B 2300/092; C01B 2300/093; C01B 2300/0946; C01B 2300/0956; C01B 2300/0976; C01B 2300/1253; C10J 3/485; C10J 2300/1606

See application file for complete search history.

(56) References Cited

U.S. PATENT DOCUMENTS 6,863,878 B2    3/2005   Klepper
8,349,046 B2    1/2013   Klepper
(Continued)

FOREIGN PATENT DOCUMENTS

WO    WO-2020008622 A1 *   1/2020

OTHER PUBLICATIONS

Machine Translation of WO-2020008622-A1 (May 2, 2024) (Year: 2024).*

*Primary Examiner* — Matthew J Merkling
(74) *Attorney, Agent, or Firm* — Wood Herron & Evans LLP

(57) ABSTRACT

A system and method for making syngas using carbonaceous feedstock, including organic material and/or polymeric material such as ground tire, wood, coal, and the like.

9 Claims, 4 Drawing Sheets

(51) Int. Cl.
*C01B 3/24* (2006.01)
*C10J 3/48* (2006.01)

(56) References Cited

U.S. PATENT DOCUMENTS

| | | | |
|---|---|---|---|
| 2004/0007507 A1* | 1/2004 | Smith | C10G 1/002 208/400 |
| 2004/0060236 A1* | 4/2004 | Yoshikawa | F23G 5/027 48/209 |
| 2007/0205092 A1* | 9/2007 | Klepper | C10J 3/50 203/4 |
| 2009/0018222 A1* | 1/2009 | Klepper | C10J 3/66 518/704 |
| 2010/0137459 A1* | 6/2010 | Stites | C10J 3/485 422/600 |
| 2010/0251614 A1* | 10/2010 | Ji | C10J 3/84 48/77 |
| 2011/0088321 A1* | 4/2011 | Kim | C10B 49/02 48/89 |
| 2013/0247448 A1* | 9/2013 | Ampulski | C10L 1/023 422/187 |
| 2016/0152905 A1* | 6/2016 | Kelfkens | C10K 3/008 422/142 |
| 2023/0106515 A1* | 4/2023 | Kim | C10K 3/02 423/650 |
| 2023/0107936 A1* | 4/2023 | You | B01J 8/0285 |

* cited by examiner

SYSTEM AND METHOD FOR MAKING SYNGAS

TECHNICAL FIELD

The present invention relates to a system and method for making syngas that includes primarily carbon monoxide and hydrogen such as for use as fuel.

BACKGROUND

Syngas, or synthesis gas, is a fuel gas mixture that includes primarily carbon monoxide and hydrogen, and may include carbon dioxide and other gases. Although it can be formed under various conditions, it basically is formed by reacting a carbon source with steam at elevated temperatures, generally in the absence of oxygen. This causes the carbon source to react with the steam, forming carbon monoxide and hydrogen, for example. One type of reactor that is particularly suited for use in the formation of syngas is disclosed in Klepper, U.S. Pat. Nos. 6,863,878 and 8,349,046. This reactor combines char with steam at elevated temperatures.

SUMMARY

The present invention overcomes the shortcomings and drawbacks of reactors for formation of syngas. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, there is a method of forming syngas. The method includes mixing fuel and oxygen with a mixture of steam and a volatized gas at a temperature effective to form syngas. The method includes directing the syngas into contact with a feed material to heat the feed material to a temperature sufficient to produce additional volatized gas from the feed material. The additional volatized gas is combined with additional fuel and additional oxygen with additional steam to produce additional syngas. In one embodiment, the cycle of forming syngas and volatized gas then continues with additional volatized gas being combined with additional fuel and additional oxygen.

In one embodiment, before directing the syngas into contact with the feed material, the method includes dividing the syngas into a first portion and a second portion. The first portion is then directed into contact with the feed material to produce additional volatized gas from the feed material. The method includes quenching the second portion of the syngas for removal. The quenched syngas is then removed.

In one embodiment, the method further includes adjusting a rate of the feed material added into contact with the first portion of syngas to control an amount of the volatized gas available during mixing.

In one embodiment, during directing, the syngas is at a temperature above Boudouard carbon formation range.

In one embodiment, during directing, the syngas is at least 700° F.

In one embodiment, before directing syngas into contact with the feed material, the method further includes capturing heat from the syngas. And, in one embodiment, after capturing heat, the method includes using the captured heat to heat a reaction area in which the mixture of steam and volatized gas flows.

In one embodiment, capturing heat includes heating water to form steam, the method further including creating a pressure differential to cause the volatized gas to flow toward a reaction area in which mixing occurs.

In one embodiment, mixing includes combusting fuel and oxygen in a combustion nozzle, and the method further includes flowing the mixture of steam and the volatized gas in a direction substantially parallel to a longitudinal axis of the combustion nozzle.

In one embodiment, mixing produces a gas flow direction and before mixing, the method further includes directing a flow of the mixture of steam and the volatized gas in a direction substantially parallel to the gas flow direction.

In one embodiment, the method further includes removing byproducts formed from directing syngas into contact with the feed material from the syngas.

According to one aspect of the invention, there is a system to produce syngas from a feed material. The system includes a volatization zone into which the feed material is added and syngas is brought into contact with the feed material to produce a volatized gas. There is a reaction area downstream of the volatization zone. The reaction area receives the volatized gas. The reaction area includes a combustion nozzle configured to be coupled to a source of fuel and to a source of oxygen and to receive and combust fuel and oxygen. The reaction area is configured to react steam and volatized gas when mixed with combusted fuel and oxygen from the combustion nozzle to produce syngas.

In one embodiment, the system further includes a transfer section downstream of the reaction area. The transfer section is configured to divide syngas into a first portion and a second portion. The first portion is directed to the volatization zone.

In one embodiment, the system further includes a quench section downstream of the transfer section. The quench section is configured to cool the second portion of syngas for removal from the system.

In one embodiment, the system further includes a heat exchanger positioned downstream of the reaction area and configured to remove heat from the syngas. In one embodiment, the system further includes a water source in thermal communication with the heat exchanger. In one embodiment, the heat exchanger is coiled around the reaction area.

In one embodiment, the system further includes an eductor positioned in a flow of the volatized gas produced in the volatization zone. The eductor is configured to produce a pressure differential between the reaction area and the volatization zone.

In one embodiment, the combustion nozzle defines a longitudinal axis, the system further includes a pathway between the volatization zone and the reaction area. The pathway has an inlet proximate the combustion nozzle. Flow of the volatized gas is substantially parallel to the longitudinal axis of the combustion nozzle.

In one embodiment, the system further includes a condenser between the volatization zone and the reaction area. The condenser is configured to remove byproducts from the volatized gas from the system before the volatized gas reaches the reaction area.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
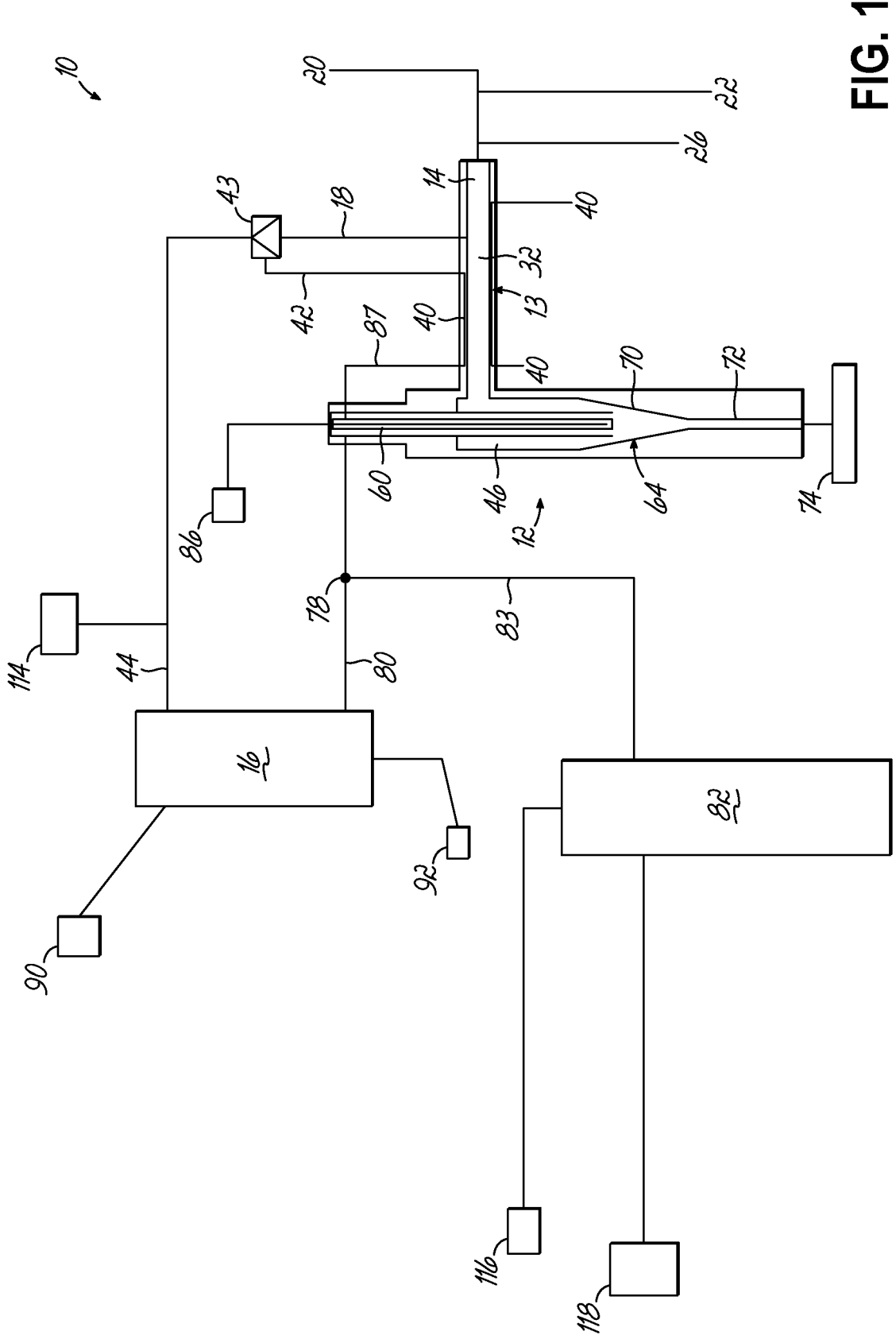
FIG. 1 is a flow diagram of a system and method for making syngas in accordance with an embodiment of the invention.

FIGS. 1-4 illustrate a system and method for making syngas 10 in accordance with an embodiment of the invention. As shown, the system and method 10 includes a syngas reactor 12 having a horizontal reactor 13 and a combustion nozzle 14. The combustion nozzle 14 is attached to a first end of the horizontal reactor 13. The combustion nozzle 14 is adapted to heat a mixture of volatile gases, such as carbon gases (e.g., methane), from a volatization zone 16 and steam introduced through a pathway 18. The combustion nozzle 14 includes an oxygen (or air) inlet 20 and a fuel inlet 22. The fuel inlet 22 leads to a concentric path surrounding the oxygen inlet 20 and to a combustion chamber 25. The fuel inlet 22 can include a gaseous carbon feed source, such as methane, for stoichiometric reaction and/or vaporized oil, syngas, and the like. The combustion nozzle 14 further includes a steam or an oxygen steam inlet 26, which again leads to a concentric path 28 that leads to an outlet immediately upstream of the combustion chamber 25. This concentric path 28 can be defined by an outer wall designed to cause steam passing through the path to swirl. In one example, the outer wall can be machined or rifled to promote swirling of the gas. Steam exiting the combustion nozzle 14 can be introduced into this section with or without excess oxygen to control gas composition and reaction temperatures.

The horizontal reactor 13 can include a steel casing and a refractory liner which defines a tubular horizontal reaction area 32 where sub-stoichiometric reactions are carried out. The pathway 18 directs the feed mixture of steam and volatized gases through an inlet 34 into the horizontal reaction area 32 immediately downstream from the combustion chamber 25 immediately forward of combustion nozzle 14. In one embodiment, the inlet 34 is upstream of a location at which the combustion chamber 25 opens to the reaction area 32. Pathway 18 is angled where it connects to horizontal reaction area 32 such that gases are directed parallel to the pathway taken by gases coming from combustion nozzle 14. This modification from perpendicular entry reduces contact between entering gases and the stoichiometric reaction stemming from combustion nozzle 14, improves reaction space and temperature, and reduces hot spotting and ash buildup in horizontal reaction area 32.

The horizontal reaction area 32 is maintained above 700° F. by the heat generated by both the combustion nozzle 14 and a superheater or heat exchanger 40. In another example, the temperature is maintained above 1000° F. In another example, the temperature may be from 1300° F. to 2300° F. in the reaction area 32. The heat exchanger 40 is closed off from the reaction area 32 such that a high temperature mixture of water and/or steam within the heat exchanger 40 is not in material communication with the reaction area 32. The water and steam mixture within heat exchanger 40 reduces wasted heat during a quenching process by absorbing excess heat from the resulting syngas that eventually can be conveyed through a pathway 42 and used at (pneumatic) steam eductor 43. In one embodiment, the heat exchanger 40 is coiled around the outside of horizontal reaction area 32. It may be desirable to run higher amounts of oxygen in the horizontal reaction area 32 to crack reachable molecules, such as methane, poly phenols, creosote, ethane, and oil, but keep surface temperatures of the walls of the horizontal reaction area 32 below that which may cause ash to fuse with the tubular materials in the reaction zone. The width and length of the horizontal reaction area 32 is determined by feed rate and the capacity to generate the requisite heat.

The steam eductor 43 is situated in material communication with pathway 18, pathway 42, and a pathway 44. The steam eductor 43 creates a pressure differential that acts as a driving force for the flow of the volatile gases from pathway 44, as well as the heated water and/or steam from super heater 40, into pathway 18. Here again, pathway 18 is also in communication with horizontal reaction area 32 and serves to facilitate the transfer of gases from steam eductor 43 through horizontal reaction area 32 into a cylindrical residence chamber 46. The super heater 40 superheats the steam within it to both act as a driving force for the eductor 43 and to control extra heat in the horizontal reaction area 32.

Figure 2:
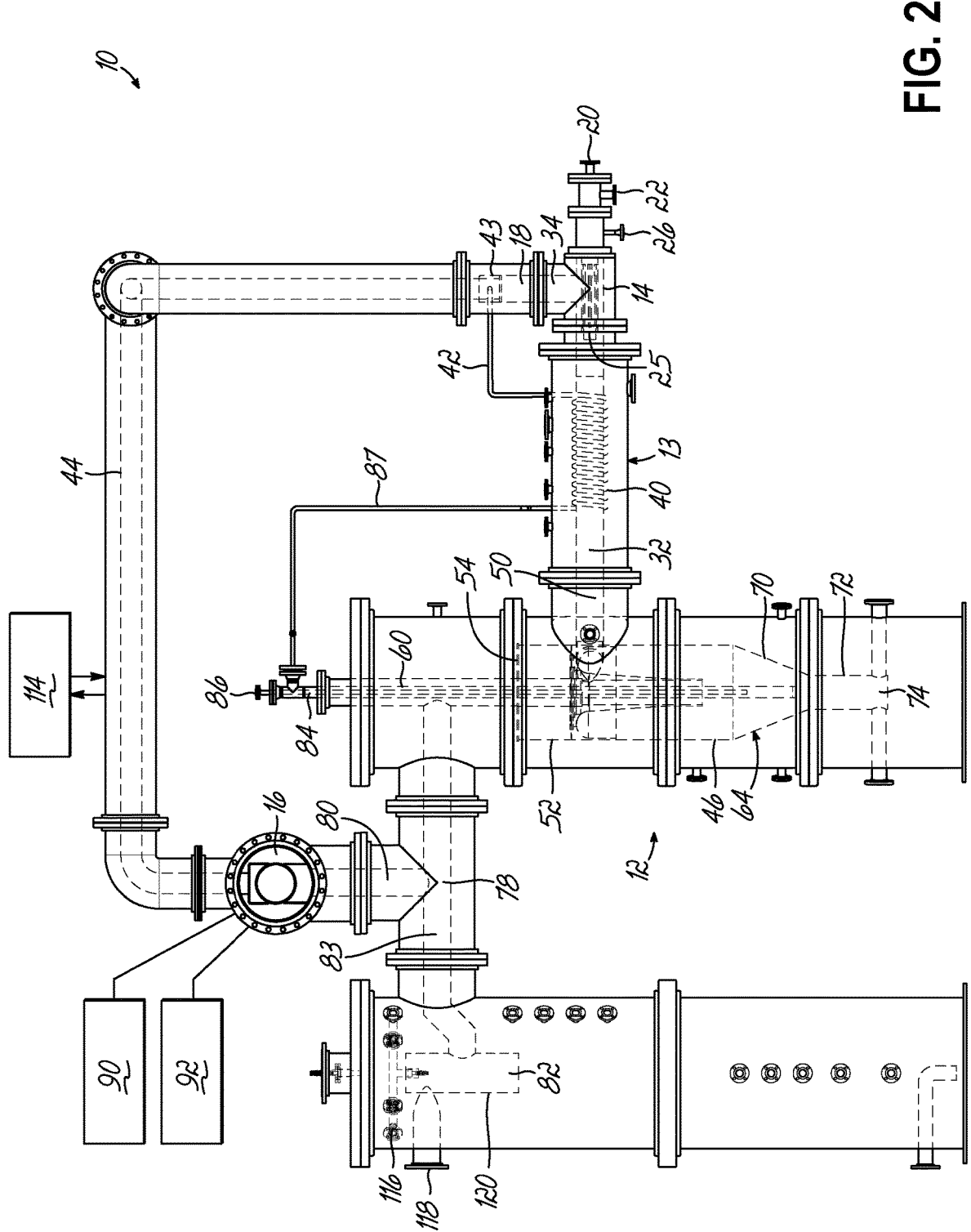
FIG. 2 is a side elevational view of the system generally depicted by FIG. 1 for making syngas in accordance with an embodiment of the invention.
Figure 3:
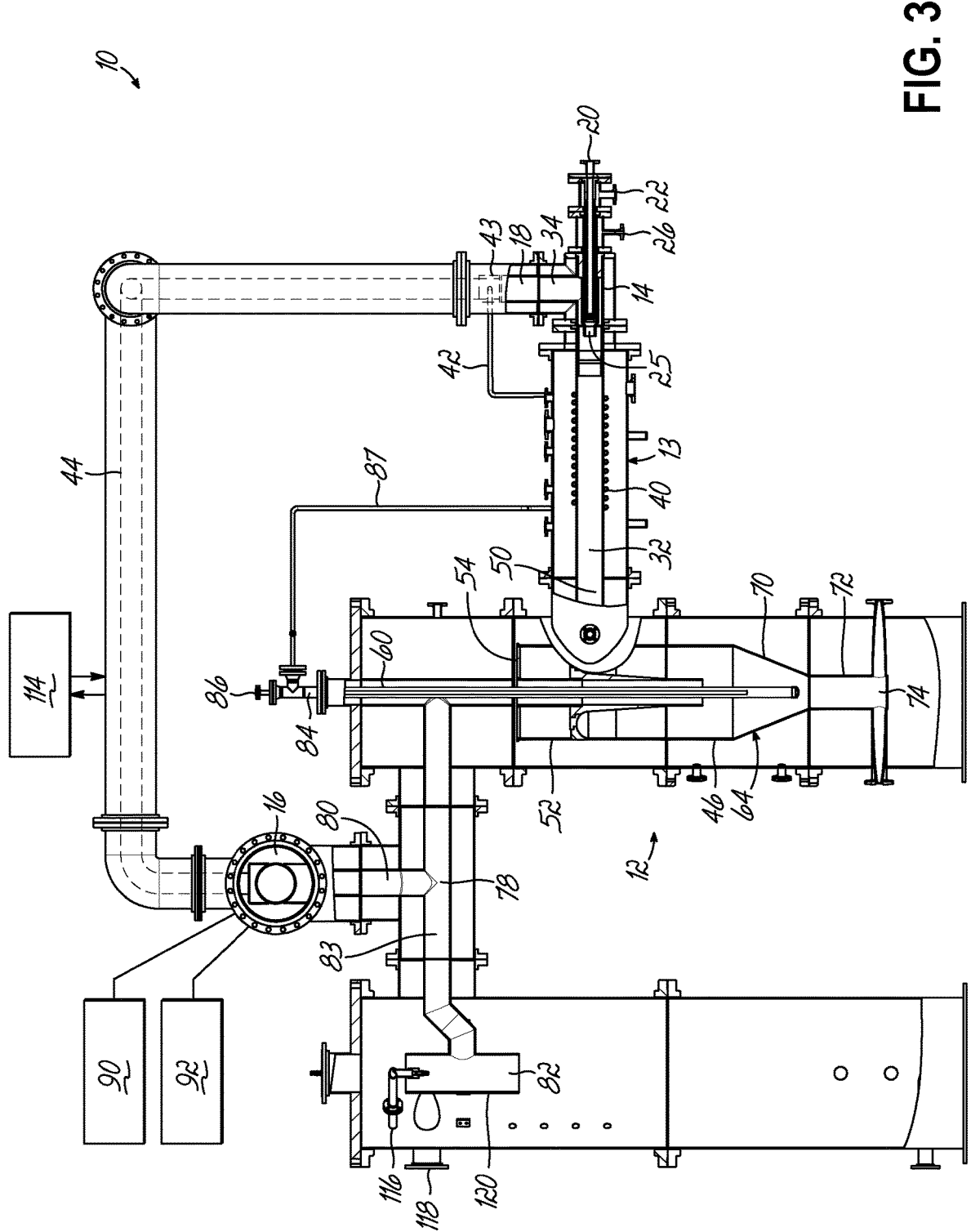
FIG. 3 is a partial cut-away view of the system of FIG. 2.
Figure 4:
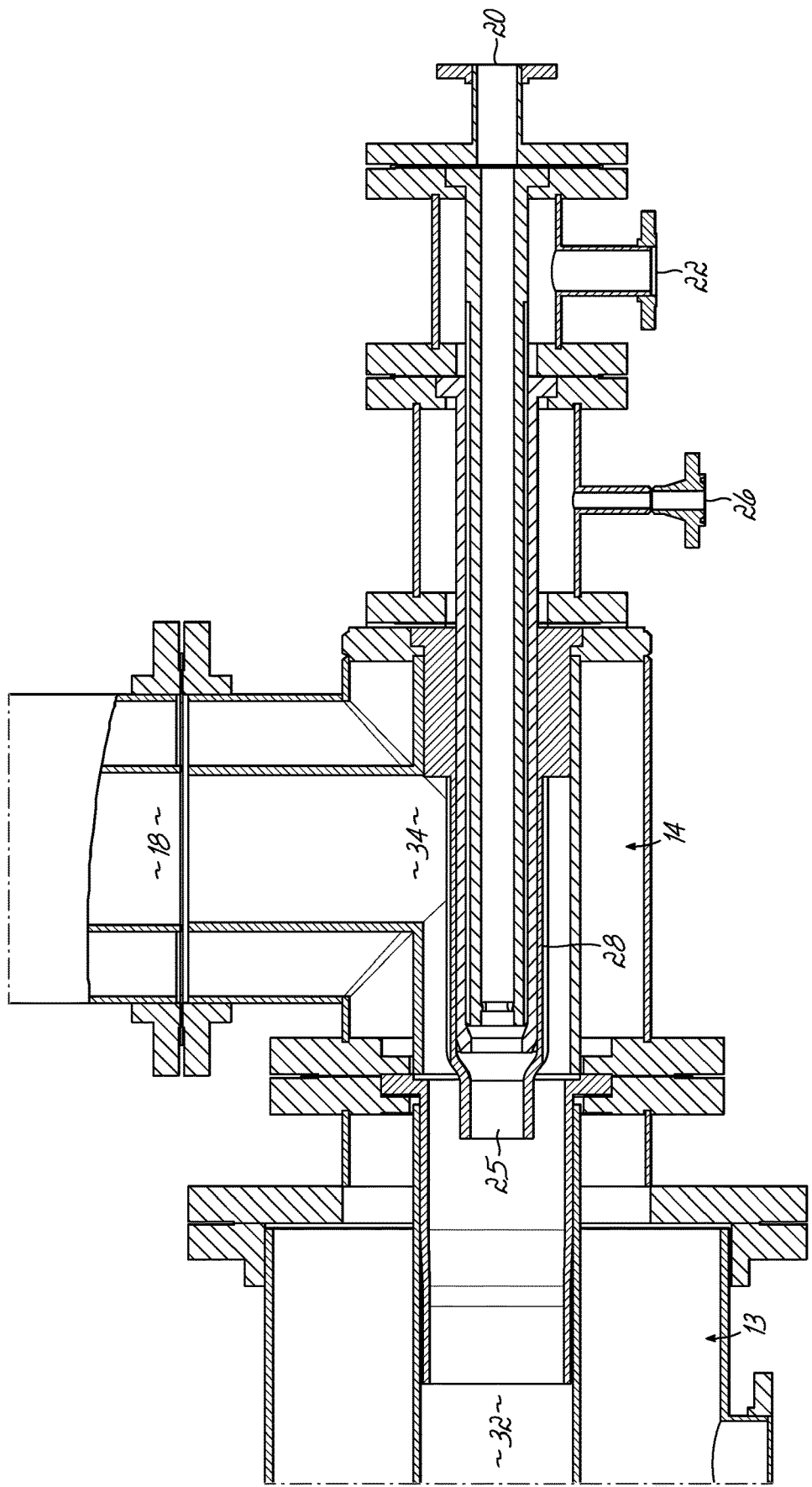
FIG. 4 is an enlarged cross-sectional view of a combustion nozzle of a syngas reactor of FIG. 3.

As best shown in FIGS. 2 and 3, a distal end 50 of the horizontal reactor 13 leads into the cylindrical residence chamber 46. The horizontal reaction area 32 is aligned along a tangent with the cylindrical residence chamber 46. The residence chamber 46 has a cylindrical wall 52 and a closed top 54. The wall can include a steel casing and a refractory lining. A gas outlet tube 60 extends through the closed top 54 into a center of the residence chamber 46 from the horizontal reaction area 32. Also, in one example, extending through the closed top 54 can be a test port inlet (not shown). The residence chamber 46, in turn, has a bottom end which is in communication with a frustoconical section 64. This frustoconical section 64 can include a steel casing and a refractory lining. Frustoconical section 64 has a tapered side wall 70 and a narrowed bottom outlet 72 that is in communication with a recovery tank 74.

Generally, the volatile gas mixture will be in the horizontal reaction area 32 for about 0.1 to 0.3 seconds, with the velocity of the gas passing through the chamber about 500 to about 3000 ft/sec. As gas travels from the horizontal reaction area 32 through its distal end 50, its tangential alignment with the cylindrical wall 52 of the cylindrical residence chamber 46 causes a swirling movement of the gas around the wall 52 of the residence chamber 46. Residence chamber 46, also maintained at a temperature of at least 700° F., provides sufficient time for complete reaction. As the reaction continues, the swirling gas is forced downwardly toward frustoconical section 64 and the resulting syngas can be collected from the outlet tube 60. The denser material formed in the reaction, such as ash, will continue into the frustoconical section 64 and continue downwardly into a recovery tank 74. This recovery tank 74 can be filled with an amount of water that will quench the ash and other useful byproducts where they can be eventually separated.

Outlet tube 60 is in communication with a transfer section 78, which is itself in communication with at least two additional different pathways. First, transfer section 78 connects to a pathway 80, which leads to volatization zone 16. Transfer section 78 is also connected to a quench section 82 through a pathway 83. The transfer section 78, pathway 80, and pathway 83 are encased by a steel casing and a refractory lining. Unless and until the flow of syngas travelling through transfer section 78 reaches the maximum flow rate allowed by pathway 80, it will travel through the pathway 80 toward the volatization zone 16 while excess syngas is directed to quench section 82.

Within the outlet tube 60 is a heat exchanger 84 that is in material communication with a water pump 86. The heat exchanger 84 is in thermal communication with the gas that travels through the outlet tube 60 to transfer section 78. In one embodiment, the heat exchanger 84 is concentric with the outlet tube 60. Heat exchanger 84 is further in material communication with a pathway 87, which in turn connects the heat exchanger 84 with heat exchanger 40. The captured heat from the heat exchanger 84 and heat exchanger 40 is used to keep the gases in the horizontal reaction zone 32 above the Boudouard reaction temperature instead of being wasted at the quench zone 82, later in the process.

Once the superheated syngas reaches the volatization zone 16, the heat from the syngas is used to drive off volatile compounds from feed material that can be reacted by exposure to heat. The syngas flowing into the volatization zone 16 may be operated by horizontal, cross, or vertical flows. The composition of the volatized gases from the feed material is dependent on both the temperature at and the feed material introduced into volatization zone 16. The amount of the feed material present in volatization zone 16 can be controlled using a material introduction zone 90 and a material removal/collection zone 92. While the feed materials are present in the volatization zone 16, they can be stirred or otherwise mechanically conveyed, for example. Generally, gas velocities are above about 500 ft/sec and up to about 3000 ft/sec and are controlled by some combination of adjusting the pressure differential at the steam eductor 43 and by adjusting the rate the feed materials are introduced from material introduction zone 90 and/or removed by zone 92. The introduction of more feed material can lead to generation of more volatile compounds, including carbon compounds. An external heater (not shown) may be applied to the volatization zone 16 for thermal improvement and thermal heat loss or to keep the temperature above the Boudouard carbon formation range. In one example, the temperature is no less than 700° F. In another example, the temperature is no less than 760° F. or no less than 1000° F.

In one example, the material introduction zone 90 and/or the material removal/collection zone 92 can include a conveyer, such as variable speed augers, to control the rate feed material is introduced and/or removed, respectively. In this example, the material introduction zone 90 can include an inlet that is in material communication with volatization zone 16. Volatization zone 16 can include horizontal central auger that directs the feed material through volatization zone 16 toward the material removal/collection zone 92. The material removal/collection zone 92 can include an inlet that directs the feed material from volatization zone 16 to the material removal/collection zone. In another example, the auger can include a variable speed auger to further control the rate materials are introduced and/or removed, respectively. Alternatively, in yet another example, the material introduction zone 90 includes a gravitational feed system.

The feed material introduced into the volatization zone 16 can be any carbonaceous material. It can be formed from organic material, polymeric material such as ground tire, wood, coal, oil shale, and the like. Materials removed via material removal/collection zone 92, such as biochar, can be later isolated from the material removal/collection zone as a useful byproduct in a downstream apparatus.

Feed material gases exit the volatization zone 16 through pathway 44 as a result of the pressure differential between zone 16 and the steam eductor 43. Pathway 44 can be encased by a refractory lining and a steel casing. Depending on the carbonaceous material added using introduction zone 90, an optional condenser 114 may be added as variable module, as shown in FIGS. 1-3. The condenser 114 can remove certain desirable byproducts, such as (essential) oils, sulfur/sulfuric acid, and the like, from pathway 44 for other downstream processes before the gases travel to the horizontal reaction zone 32 for thermal conversion. In one example, the condenser 114 can remove certain desirable byproducts by distillation and the like. After the gases travelling through pathway 44 reach the steam eductor 43, the pressure differential pulls the mixture of steam and volatized gases back into the horizontal reaction zone 32 as described above. The refractory lining and steel casing can also encompass the steam eductor 43 and pathway 18.

With further reference to FIG. 1, quench zone 82 is in communication with transfer section 78, a quench water pump 116, and a syngas exit 118. The quench zone 82 can include a cylindrical wall 120 having a steel casing and a refractory lining. Excess syngas that travels to quench zone 82 instead of volatization zone 16 can be rapidly cooled to 100° F. or less to prevent the formation of Boudouard carbon. This rapid cooling of excess syngas can be done using a quench water pump 116 to control the heat and space within quench zone 82 by adding an amount of water corresponding to the volume and heat of excess syngas. Once cooled, the excess syngas travels to the syngas exit 118 where different product gases, such as hydrogen and carbon dioxide, can be utilized.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the scope of applicant's general inventive concept.

What is claimed is:

1. A system to produce syngas from a feed material comprising:
    a volatization zone into which the feed material is added and syngas is brought into contact with the feed material to produce a volatized gas;
    a reaction area downstream of the volatization zone to receive the volatized gas, the reaction area including a combustion nozzle configured to be coupled to a source of fuel and to a source of oxygen and to receive and combust fuel and oxygen, the reaction area being configured to react steam and volatized gas when mixed with combusted fuel and oxygen from the combustion nozzle to produce syngas; and
    a heat exchanger positioned downstream of the reaction area and configured to remove heat from the syngas, wherein the heat exchanger is coiled around the reaction area.

2. The system of claim 1 further comprising:
a transfer section downstream of the reaction area and configured to divide syngas into a first portion and a second portion, the first portion being directed to the volatization zone.

3. The system of claim 2 further comprising:
a quench section downstream of the transfer section and configured cool the second portion of syngas for removal from the system.

4. The system of claim 1 further comprising:
a water source in thermal communication with the heat exchanger.

5. The system of claim 1 further comprising:
an eductor positioned in a flow of the volatized gas produced in the volatization zone and configured to produce a pressure differential between the reaction area and the volatization zone.

6. The system of claim 1 wherein the combustion nozzle defines a longitudinal axis, the system further comprising:
a pathway between the volatization zone and the reaction area, the pathway having an inlet proximate the combustion nozzle, whereby flow of the volatized gas is substantially parallel to the longitudinal axis of the combustion nozzle.

7. The system of claim 1 further comprising:
a condenser between the volatization zone and the reaction area and configured to remove byproducts from the volatized gas from the system before the volatized gas reaches the reaction area.

8. A system to produce syngas from a feed material comprising:
a volatization zone into which the feed material is added and syngas is brought into contact with the feed material to produce a volatized gas;
a reaction area downstream of the volatization zone to receive the volatized gas, the reaction area including a combustion nozzle configured to be coupled to a source of fuel and to a source of oxygen and to receive and combust fuel and oxygen, the reaction area being configured to react steam and volatized gas when mixed with combusted fuel and oxygen from the combustion nozzle to produce syngas; and
an eductor positioned in a flow of the volatized gas produced in the volatization zone and configured to produce a pressure differential between the reaction area and the volatization zone.

9. The system of claim 8 further comprising:
a heat exchanger positioned downstream of the reaction area and configured to remove heat from the syngas,
wherein the heat exchanger is coiled around the reaction area.

* * * * *

UNITED STATES PATENT AND TRADEMARK OFFICE
CERTIFICATE OF CORRECTION

| | | |
|---|---|---|
| PATENT NO. | : 12,227,415 B2 | Page 1 of 1 |
| APPLICATION NO. | : 17/363591 | |
| DATED | : February 18, 2025 | |
| INVENTOR(S) | : James E. Klepper et al. | |

It is certified that error appears in the above-identified patent and that said Letters Patent is hereby corrected as shown below:

In the Specification

In Column 4, Lines 45-46, change "Generally, the volatile gas mixture will be in ... for about 0.1 to 0.3 seconds with the" to -- Generally, the volatile gas mixture will be in ... for about 0.1 to 0.3 second with the --.

In the Claims

In Column 7, Claim 3, Lines 7-8, change "a quench section downstream of the transfer section and configured cool the second portion of syngas for" to -- a quench section downstream of the transfer section and configured to cool the second portion of syngas for --.

Signed and Sealed this
Fifteenth Day of April, 2025

Coke Morgan Stewart
*Acting Director of the United States Patent and Trademark Office*